UNITED STATES PATENT OFFICE.

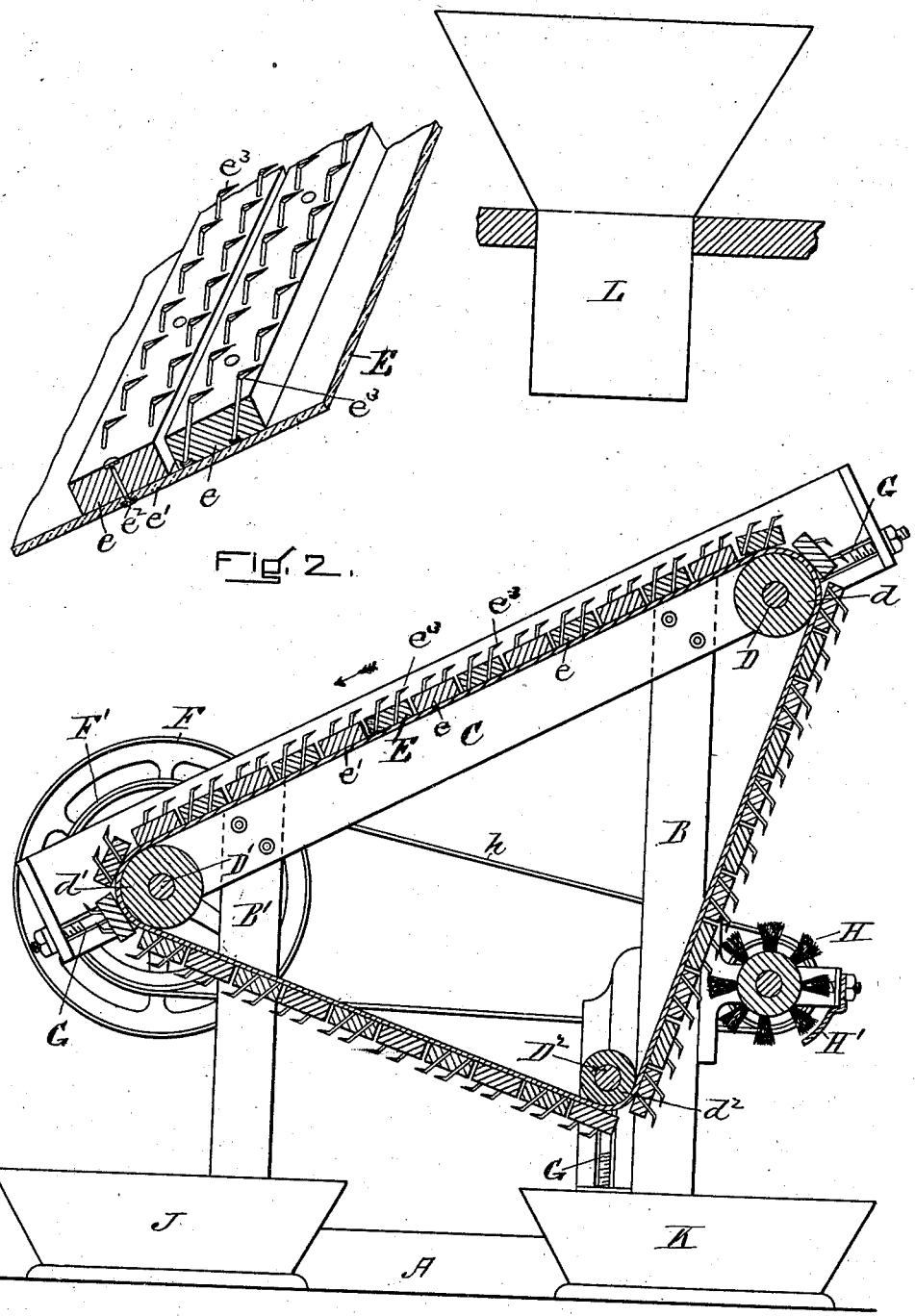

ROMAN DERDEYN, OF VICKSBURG, MISSISSIPPI.

GRABOT-CLEANER.

SPECIFICATION forming part of Letters Patent No. 669,821, dated March 12, 1901.

Application filed October 1, 1900. Serial No. 31,597. (No model.)

*To all whom it may concern:*

Be it known that I, ROMAN DERDEYN, of Vicksburg, in the county of Warren and State of Mississippi, have invented a new and useful Improvement in Grabot-Cleaners, of which the following is a specification.

Cotton-seed when first handled after ginning contains a certain proportion of hulls, nails, and other foreign matter which when extracted take with them an amount of cotton which is worth saving. This mass of hulls and cotton, usually called "grabot," has hitherto been considered worthless, and the machine to be described is devised for the purpose of saving the cotton by separating it mechanically from the foreign matter which is mixed with it.

My invention will be understood by reference to the drawings, in which is shown the preferred embodiment of my invention.

Figure 1 is a vertical section of a machine embodying my invention, Fig. 2 being an enlarged sectional detail in perspective showing the construction of the conveyer which forms a part of the machine.

As the two sides of the machine are alike, a sectional view only is given, the machine being of any desired width, preferably a little wider than the width of the feeding-trough.

A is the base, upon which are mounted four uprights. The front uprights B are longer than the rear uprights B'. Each pair of uprights B B' is connected at its upper end by a cross-piece C, so as to form two side frames.

D D' $D^2$ are shafts, each mounted in suitable bearings in each side frame. Each shaft carries a pulley or roller $d$ $d'$ $d^2$, fast thereto and of sufficient length to occupy the space between the two sides of the machine. About these three rollers passes an endless conveyer E, of peculiar construction, now to be described. This conveyer consists of a series of cross bars or slats $e$, each riveted or otherwise attached to an endless belt $e'$ by rivets $e^2$ and each carrying a series of projections, preferably pointed hooks $e^3$. The projections are preferably arranged to project from the slats at an angle and to have their points lie parallel with the upper surface of the slats. The points of these projections, as shown, all turn in the same direction, so as to form hooks pointing in a reverse direction to that in which the conveyer moves. The shafts D D' are preferably arranged at different levels, as shown in Fig. 1, so that so much of the conveyer as is in a receiving position will run in a direction preferably nearer horizontal than vertical—say, for example, at an angle of about thirty degrees with the base. After passing over the rollers $d$ $d'$ the conveyer changes its direction, passing down and under the roller $d^2$, which is preferably located between the other two rollers, as shown, and up again to the roller $d$.

F is a pulley on the end of the shaft $d'$, by which power is applied to the said shaft and its roller D' to move the conveyer E in the direction shown by the arrow. The shafts D D' $D^2$ are each preferably provided with a belt-tightener G, which may be of any ordinary construction and by means of which the position of the shafts may be altered somewhat to conform to any desired conditions.

H is a rotary brush, to which power may be applied by a belt $h$, running from the pulley F', or in any other desired way.

J represents a bin to receive the waste, and K a corresponding bin to receive the cotton.

The operation of my machine is as follows: The mass of grabots is discharged from the spout L of the boll-screen and falls upon the conveyer E, which moves in the direction of the arrow. The locks of cotton become entangled upon the hooks and are carried by the conveyer with the waste until the conveyer changes its direction at the roller $d'$, when the foreign matter or waste drops off into the bin J, the cotton entangled on the hooks being retained by the conveyer until it has changed its direction again at $d^2$, when, owing to the shape of the hooks, it drops off or is brushed off by the brush H. The roller $d^2$ is located between the other rollers, as above described, in order to allow the fiber when freed from the hooks to fall into the bin K without obstruction, and the brush is located between the roller $d^2$ and the roller $d$, so that the fiber when brushed from the hooks will fall into the bin.

It will be seen upon considering the operation of this device that it is desirable that neither of the three sides of the triangle formed by the conveyer should be either horizontal or vertical for the best results. The upper side being at an angle, as shown, prevents the heavier portions of the waste from becoming lodged in the conveyer, and they have a tendency to roll by gravity down the conveyer and off its end. It is also apparent that the success of the device is not dependent upon the form of the conveyer or upon its exact construction, the number of rollers about which it passes, or the exact shape of its hooks, so long as it contains means for preventing the grabot mass from falling from the spout directly through it and so long as it provides means for not only catching the cotton, but carrying it over and beyond the bin provided to receive the waste and discharging it into the cotton-receiving bin. It is also apparent that in some cases the brush H may be unnecessary. The brush H, however, is very desirable to insure the proper cleaning of the hooks $e^8$, and if a rotary brush be used a choke-board H' is desirable to assist in freeing the brush from the fiber.

What I claim as my invention is—

1. The grabot-cleaner above described consisting in an endless conveyer having a series of hooked projections from its outer surface and mounted to travel around two or more drums, whereby it will move from a receiving position about a drum to deposit the waste, and about a second drum to deposit the fiber, said hooks holding the fiber until said conveyer has passed about said second drum, in combination with means for operating said conveyer, as and for the purposes set forth.

2. The grabot-cleaner above described consisting of an endless conveyer mounted upon two or more drums and provided with hooks projecting from its outer surface, said conveyer being mounted to change its direction of movement from a receiving position to a position for conveying the fiber alone and again to change its direction to a receiving position, whereby during its first change of direction it will deposit the waste, and during its second change of direction will deposit the fiber, as and for the purposes described.

3. In a grabot-cleaner in combination with an endless conveyer and means whereby said conveyer is operated, said conveyer being provided with hooked projections from its outer surface and being mounted to change its direction from a receiving position and to deposit the waste during said change of direction, then to change its direction again and to deposit the fiber during said second change of direction, whereby the waste and fiber are deposited in two separate locations, as and for the purposes described.

4. In a grabot-cleaner an endless conveyer of the kind described mounted to travel about three rollers, in combination with means for moving said conveyer, each of said rollers being located at a different level from the others and the lower roller being located between the other two whereby no portion of said conveyer will be either horizontal or vertical, the receiving portion of said conveyer moving downward at an angle to a position where upon change of direction it may discharge its heavier contents and yet retain its fiber, and again passing downward and rearward and again changing its direction to pass upward and outward whereby the fiber retained thereon may be discharged to fall downward without danger of reëngagement with said conveyer, as set forth.

5. In a grabot-cleaner, a conveyer mounted upon and adapted to travel about three shafts, and provided with means whereby it is operated, said conveyer being composed of a series of slats from each of which projects a series of hooks, the points of which are turned in a reverse direction to that in which said conveyer travels, whereby a portion of said conveyer is retained in a nearly horizontal position and as it passes over a shaft is caused to deposit the waste, and as it passes over a second shaft is caused to deposit the fiber, as and for the purposes described.

6. In a grabot-cleaner in combination with three rollers each located at a different distance from the floor from the others, the lower roller being located between the other two, and means whereby power is applied to one of said rollers, an endless conveyer passing around said rollers and adapted to move in a downward direction and a rotary brush located to engage said conveyer during its upward and outward movement whereby it is adapted to clean said conveyer of fiber at a point where it may drop clear of said conveyer, as set forth.

In witness whereof I have hereunto set my name this 24th day of September, 1900.

ROMAN DERDEYN.

Witnesses:
T. R. MARSHALL,
G. H. RIGBY.